(12) United States Patent
Carroll, Jr. et al.

(10) Patent No.: US 7,187,396 B2
(45) Date of Patent: Mar. 6, 2007

(54) LOW VISIBILITY LASER MARKING ADDITIVE

(75) Inventors: James B. Carroll, Jr., Cortlandt Manor, NY (US); Steven A. Jones, Budd Lake, NJ (US)

(73) Assignee: Engelhard Corporation, Iselin, NJ (US)

( * ) Notice: Subject to any disclaimer, the term of this patent is extended or adjusted under 35 U.S.C. 154(b) by 18 days.

(21) Appl. No.: 10/976,777

(22) Filed: Nov. 1, 2004

(65) Prior Publication Data

US 2005/0137305 A1    Jun. 23, 2005

Related U.S. Application Data

(60) Provisional application No. 60/518,483, filed on Nov. 7, 2003, provisional application No. 60/605,888, filed on Aug. 30, 2004.

(51) Int. Cl.
G03G 5/02    (2006.01)
B41J 2/005   (2006.01)

(52) U.S. Cl. ................ 347/224; 430/108.6; 430/108.7; 977/951

(58) Field of Classification Search ............ 430/108.6, 430/108.7; 347/224; 977/951
See application file for complete search history.

(56) References Cited

U.S. PATENT DOCUMENTS

| | | | |
|---|---|---|---|
| 4,753,863 A | 6/1988 | Spanjer | |
| 4,822,973 A | 4/1989 | Fahner et al. | |
| 4,861,620 A * | 8/1989 | Azuma et al. | 427/556 |
| 5,128,081 A | 7/1992 | Siegel et al. | |
| 5,300,350 A * | 4/1994 | Grosser et al. | 428/195.1 |
| 5,472,640 A * | 12/1995 | Bruckner et al. | 428/402.24 |
| 5,484,694 A | 1/1996 | Lelental et al. | |
| 5,486,675 A | 1/1996 | Taylor et al. | |
| 5,569,413 A | 10/1996 | Jacobson | |
| 5,582,963 A | 12/1996 | Tsukada | |
| 5,705,328 A | 1/1998 | Shiozaki | |
| 5,711,783 A | 1/1998 | Schloh | |
| 5,772,924 A | 6/1998 | Hayoshi et al. | |
| 5,788,738 A | 8/1998 | Pirzada et al. | |
| 5,851,507 A | 12/1998 | Pirzada et al. | |
| 5,876,683 A | 3/1999 | Glumac et al. | |
| 5,928,780 A | 7/1999 | Schmidt et al. | |
| 5,945,035 A * | 8/1999 | Vogt et al. | 252/520.1 |
| 5,958,361 A | 9/1999 | Laine et al. | |
| 5,984,997 A | 11/1999 | Bickmore et al. | |
| 6,132,653 A | 10/2000 | Hunt et al. | |
| 6,214,916 B1 * | 4/2001 | Mercx et al. | 524/404 |
| 6,214,917 B1 * | 4/2001 | Linzmeier et al. | 524/430 |
| 6,217,949 B1 * | 4/2001 | Corbett | 438/799 |
| 6,376,577 B2 * | 4/2002 | Kniess et al. | 523/215 |
| 6,521,688 B1 | 2/2003 | Linzmeier et al. | |
| 6,569,397 B1 | 5/2003 | Yadav et al. | |
| 6,600,127 B1 | 7/2003 | Peterson et al. | |
| 6,627,299 B1 | 9/2003 | Feng et al. | |
| 6,667,360 B1 * | 12/2003 | Ng et al. | 524/492 |
| 6,693,657 B2 * | 2/2004 | Carroll, Jr. et al. | 347/224 |
| 6,727,308 B2 | 4/2004 | Kniess et al. | |
| 2002/0171732 A1 * | 11/2002 | Carroll et al. | 347/224 |

FOREIGN PATENT DOCUMENTS

| | | |
|---|---|---|
| CA | 2179698 | 12/1996 |
| DE | 202004 003 362 U1 | 6/2004 |
| WO | WO 01/00719 A1 | 1/2001 |
| WO | WO 02/060988 A1 | 8/2002 |
| WO | WO 02/083567 A2 | 10/2002 |

OTHER PUBLICATIONS

TAL Materials, Inc. "Flame Spray Pyrolisys (FSP) Technology." <www.talmaterials.com/technew.htm>.
PCT International Search Report for PCT/US2004/036869.
Patent Abstracts of Japan, vol. 018, No. 061 (C-1160), Publication No. 05 279039A, Mitsubishi Materials, Publication Date Oct. 26, 1993.

* cited by examiner

*Primary Examiner*—H. Thi Le
(74) *Attorney, Agent, or Firm*—Melanie L. Brown

(57) ABSTRACT

Laser marking of plastic material is achieved by incorporating into the plastic a laser marking particulate additive having a particle size of less than 100 nm. A mixed oxide particle of tin and antimony having a particle size of 10–70 nm is useful as a laser marking additive when using a YAG laser. A metallic powder can further be added to improve marking contrast.

17 Claims, No Drawings

LOW VISIBILITY LASER MARKING ADDITIVE

This application claims priority to Provisional Applications U.S. 60/518,483, filed Nov. 7, 2003, and U.S. 60/605,888, filed Aug. 30, 2004.

FIELD OF THE INVENTION

The present invention is directed to a low visibility laser marking additive and the particular use of such additive for applying markings to a variety of plastic articles and coatings.

BACKGROUND OF THE INVENTION

A number of printing techniques for applying markings to articles, including screen printing and transfer printing, are well known. These are generally surface printing methods which means that the identification mark realized can become unreadable through mechanical damage, abrasion, chemical influences, and the like. Such printing is particularly difficult to apply to curved or textured surfaces and the special tooling costs required add to the overall cost of the product.

The labeling of products is becoming of increasing importance in virtually all sectors of industry. Thus, for example, production dates, use-by dates, bar codes, company logos, serial numbers, etc., must frequently be applied. At present, these marks are predominantly made using conventional techniques such as printing, embossing, stamping, and labeling. However, the importance of non-contact, very rapid and flexible marking using lasers, in particular in the case of plastics, is increasing. This technique makes it possible to apply graphic inscriptions, for example bar codes, at high speed even on a non-planar surface. Since the inscription is in the plastic article itself, it is durable and abrasion-resistant.

The desirability of marking articles through the use of a laser system is well known. Lasers have been developed so that the beam impinged on the article to be marked can be highly focused to provide fine lines in the form of letters and/or numbers of the desired size, as well as images. Lasers permit the marking to be on the surface of the article or beneath the surface. In many instances, it is desirable to have the mark disposed subsurface in order to make it more difficult to remove the indication. Such a subsurface mark, can for example, contribute to anti-counterfeiting efforts. Laser marking, whether surface or subsurface, has also been used, for example, for electronically scanning and control purposes during production.

A number of laser beam processes in which an identification mark is burned into the surface of an article part are known. The resulting rough surface usually has to be coated with a transparent lacquer on account of the danger of contamination and the unpleasant feel that results. This can become a very involved operation in the case of mass produced parts and adds to the cost of the product.

The use of laser beam marking systems for creating subsurface marks is also known. Such systems are based on creating the mark by having the article to be marked be composed of a special configuration of materials or incorporating a material within the article which either becomes visible when exposed to the laser beam or causes something else present to become visible.

For example, U.S. Pat. No. 4,822,973 discloses a system in which the laser beam passes through the surface of a first plastic material in order to be absorbed in a layer of a second plastic material. This system requires a special configuration of materials of construction in the part to be marked. Other systems incorporate a quantity of carbon black, coated or uncoated "silicate containing" materials such as mica, talc, or kaolin, or a highly absorbing green pigment, all of which absorb energy from the laser beam to produce a visible mark. However, these materials have a degree of color or import a hazy quality to the plastic which is sufficient to be visible prior to application of the laser beam and that can be unsightly or interfere with the distinctness of the mark after the laser beam has been applied. This disadvantaging characteristic is aggravated by the fact that these additives tend to require a high loading content into the article to be marked, which is not only undesirable because of the effect on appearance but also can effect the physical and mechanical properties of the object. Further, absorbance of the laser beam to cause local heating also causes a degree of foaming which may detract from the creation of a fine and distinct dark mark, resulting in a blemished product.

Typically, the additives tend to be specific to the wavelength emitted by the laser. For example, laser marking materials initially developed for use in conjunction with carbon dioxide lasers tend not to work particularly well (or even at all) with the increasingly popular yttrium aluminum garnet (YAG) lasers which require a material which absorbs at 1064 nm.

In commonly assigned, U.S. Pat. No. 6,693,657, issued Feb. 17, 2004, a novel YAG laser marking additive (MARK-IT™) and its use is described. The YAG laser marking additive is a calcined powder of co-precipitated mixed oxides of tin and antimony. When the powder absorbs YAG laser energy and converts it into heat, carbonization of the surrounding material occurs and results in the formation of a black or dark mark that contrasts to the remainder of the surrounding area. Because of the particle size of the powder and its efficiency, the powder does not impart an appreciable amount of color to the object in which it is incorporated. It also does not cause excess foaming so that the mark achieved is smoother in texture.

Laser marking additives render polymers laser markable by acting as a light absorber for the laser light. Materials that act in this capacity often absorb visible light as well, which imparts a color to the piece to be marked. The color can be in contrast to the desired color of the piece, or it may dilute the desired color. The additive may also reduce clarity of a transparent piece. An appearance change can also be due to scattering of light by the additive. This can happen whether the additive has color or not. As a result, laser marking additives must be used in low concentrations, and/or not used in transparent applications.

It is therefore an object of this invention to provide a laser marking additive which will produce a black or dark mark contrasting with the surrounding area when exposed to laser energy but prior thereto does not impart an appreciable color to the surrounding area or cause a significant change in the performance of the material in which it has been added. Traditional additives cause transparent polymers to appear hazy, as such polymers lose optical clarity and are no longer crystal clear.

This invention produces a laser marking additive that does not change the color or appearance of articles at equivalent loadings to normal laser marking additives, and retains the laser markability of the piece. Moreover, optical clarity of clear and transparent polymers is maintained.

SUMMARY OF THE INVENTION

This invention produces a laser marking additive which does not change the color or appearance of articles, including optical clarity, and retains the laser markability of the piece. The laser marking additives are particularly useful in processes for marking plastic articles, including transparent plastic components, as well as for marking applied polymeric coatings or inks. Polymers incorporating the additive material of this invention lasermark readily with lasers. Transparent polymers maintain initial optical clarity and do not look hazy upon incorporation and laser marking of the article formed therefrom. The laser marking additives of this invention retain the absorptivity of the laser light, a key requirement of laser marking additives, by retaining the absorption coefficient at the laser wavelength. What is reduced is the scattering power of the pigment. The scattering power is the component that determines the visibility of the pigment in the piece. The scattering power of the additive of the invention is reduced by making the particle size of the additive extremely small, i.e., nano-sized. In this invention, the laser marking additive is less than 100 nm in size.

DESCRIPTION OF THE INVENTION

In the laser marking methods of the invention, any laser that has readily adjustable variable parameters that govern laser energy characteristics, such as pulse content, pulse duration and pulse frequency, may be employed. Preferably, the laser has a wavelength in the near infrared (780 nm to 2000 nm), the visible range (380 nm to 780 nm), or the near ultraviolet range (150 nm to 380 nm). Suitable lasers include, but are not limited to, solid state pulsed lasers, pulsed metal vapor lasers, excimer lasers and continuous wave lasers with pulse modification, such as the commercially available Nd:YAG laser (wavelength 1064 nm), frequency-doubled Nd:YAG laser (wavelength 532 nm), excimer laser (wavelength 193 nm–351 nm), and $CO_2$ laser (10.6 μm).

In this invention, the plastic articles suitable for laser marking include any plastic articles that are molded, extruded or formed by any known conventional method. The plastic articles comprise resins and laser energy absorbing additives, as described below, and may further comprise other additives provided the additives do not interfere with the laser marking of the articles. Such other additives are known to those skilled in the art of polymer compounding and include, but are not limited to, reinforcing fillers, flame retardants, antioxidants, dispersants, impact modifiers, ultraviolet stabilizers, plasticizers, and the like. The laser energy absorbing additives of this invention may also be incorporated into plastic coatings, including coatings or inks formed from aqueous or non-aqueous solutions or dispersions of polymeric materials or powdery polymeric coatings. Such coatings or inks can be applied onto the surface of any article such as those formed of plastic, metal, glass, ceramic, wood, etc. Thus, the plastic coatings containing the laser marking additives of this invention allow the use of lasers to mark any type of substrate.

In this invention, the laser energy absorbing additive is capable of absorbing light preferably in the near infrared range, the visible range, and/or the near ultraviolet range. Exemplary additives include, but are not limited to, carbon black, graphite, zirconium silicates, calcium silicates, zeolite, cordierite, mica, kaolin, talc, silica, aluminum silicates, metal salts such as copper phosphates, and the like. Any commercially available organic pigment or inorganic pigment is suitable for use as a colorant. Exemplary organic pigments include, but are not limited to, Barium red 1050® (Cook Son), Filamid yellow R®, Filamid red GA®, Heliogen green K8730®, Heliogen blue K6911D®, LISA red 57Y® LISA red 61R (Bayer), 1290 Rightfit™ Yellow, 2920 Rightfit™ Brilliant Orange, 1112 Rightfit™ Scarlet (Engelhard), and the like.

The laser marking additives such as those listed above and hereinafter described have a size less than 100 nm. Various and known methods are available for forming the laser marking additives into nano-sized particles, as will be more fully described below. Typically, the laser marking additive will comprise 0.01 to 5% by weight of the resin component which forms the plastic article or coating. Even at the higher loadings, the presence of the nano-sized additives of this invention may still only minimally change the color of the resin.

In accordance with the present invention, a particularly useful additive is one that is adapted for use in conjunction with a YAG laser. A useful example is an additive of a powder of mixed oxides of tin and antimony. The powder is principally tin oxide and only a small amount of antimony oxide that is expressed as $Sb_2O_3$. The $Sb_2O_3$ level can be up to about 17% of the mixed oxide. Preferably, the amount of antimony oxide is about 1 to 5% by weight of the mixed oxide. A particularly exemplary additive of a mixed oxide of tin and antimony will have a particle size of from about 10–70 nm, more preferably 20–50 nm. A loading of $Sb_2O_3$ of 2% by weight in the mixed oxide has been found to be particularly useful.

Techniques for producing nano-sized materials generally fall into one of three categories, namely, mechanical processing, chemical processing, or physical (thermal) processing. In mechanical processes, fine powders are commonly made from large particles using crushing techniques such as a high-speed ball mill. With chemical processes, nano materials are created from a reaction that precipitates particles of varying sizes and shapes using a family of materials known as organometallics (substances containing combinations of carbon and metals bonded together) or various metal salts. The chemical processes are often combined with thermal processing, e.g. pyrolysis.

Chemical processing can take place in the gas or liquid phase. Gas phase syntheses include metal vapor condensation and oxidation, sputtering, laser-ablation, plasma-assisted chemical vapor deposition, and laser-induced chemical vapor deposition. Liquid phase processing encompasses precipitation techniques, and sol-gel processing. Aerosol techniques include spray drying, spray pyrolysis, and flame oxidation/hydrolysis of halides.

Of the aerosol processing techniques available for production of ceramic powders, spray pyrolysis and flame oxidation of halides are the primary methods used to produce ultrafine powders. In both methods, submicron sized droplets of solutions of metal salts or alkoxides can be produced by standard aerosolization techniques. In spray pyrolysis, the resulting aerosol is thermolyzed, to pyrolytically convert the aerosol droplet to an individual ceramic particle of the same stoichiometry as the parent solution. Thermal events in the process include solvent evaporation, solute precipitation, thermal conversion of the precipitate to a ceramic, and sintering of the particle to full density.

Spray pyrolysis is most commonly used for the preparation of metallic ceramic powders. The resultant powders typically have sizes in the 100–10,000 nm range. The particle sizes produced are controlled by the size of droplets within the aerosol and the weight percent dissolved solids in the solution. The final particle size decreases with smaller initial droplet sizes and lower concentrations of dissolved solids in solution.

Aerosolization may be accomplished by several well known technologies. For example, a precursor solution may be atomized by flow through a restrictive nozzle at high pressure, or by flow into a high volume, low pressure gas stream. When such atomizers are used, the high volume gas stream should be air, air enriched with oxygen, or preferably substantially pure oxygen. When high pressure atomization through a restrictive orifice is used, the orifice is preferably surrounded by jets of one of the above gases, preferably oxygen. More than one atomizer for aerosolization may be positioned within the flame pyrolysis chamber. Other aerosol-producing methods, for example ultrasonic or piezoelectric droplet formation, may be used. However, some of these techniques may undesirably affect production rate. Ultrasonic generation is preferred, the aerosol generator generating ultrasound through reasonant action of the oxygen flow and the liquid in a chamber.

The aerosol is ignited by suitable means, for example laser energy, glow wire, electrical discharge, but is preferably ignited by means of an oxyhydrogen or hydrocarbon gas/oxygen torch. Prior to initiating combustion, the flame pyrolysis chamber is preheated to the desired operating range of 500° C. to 2000° C., preferably 700° C. to 1500° C., and most preferably 800° C. to 1200° C. Preheating improves particle size distribution and minimizes water condensation in the system. Preheating may be accomplished through the use of the ignition torch alone, by feeding and combusting pure solvent, i.e. ethanol, through the atomizer, by resistance heating or containment in a muffle furnace, combinations of these methods, or other means.

The following U.S. patents disclose non-limiting examples of how to form nano-sized particles and all are herein incorporated by reference in their entirety: U.S. Pat. Nos. 5,128,081; 5,486,675; 5,711,783; 5,876,386; 5,958,361; 6,132,653; 6,600,127.

Other methods of forming nanoparticles are disclosed in U.S. patents assigned to Nanoproducts Corporation, Tucson, Ariz. U.S. Pat. Nos. 5,788,738; 5,851,507; 5,984,997; and 6,569,397 are herein incorporated by reference in their entirety.

U.S. Pat. No. 5,788,738 discloses a thermal reactor system for producing nanoscale powders by ultra-rapid thermal quench processing of high-temperature vapors through a boundary-layer converging-diverging nozzle. A gas suspension of precursor material is continuously fed to a thermal reaction chamber and vaporized under conditions that minimize superheating and favor nucleation of the resulting vapor. The high temperature vapor is quenched using the principle of Joule-Thompson adiabatic expansion. Immediately after the initial nucleation stages, the vapor stream is passed through the nozzle and rapidly quenched through expansion at rates of at least 1,000° C. per second, preferably greater than 1,000,000° C. per second, to block the continued growth of the nucleated particles and produce a nanosize powder suspension of narrow particle-size distribution.

U.S. Pat. No. 5,851,507 discloses a continuous process that produces nanoscale powders from different types of precursor material by evaporating the material and quenching the vaporized phase in a converging-diverging expansion nozzle. The precursor material suspended in a carrier gas is continuously vaporized in a thermal reaction chamber under conditions that favor nucleation of the resulting vapor. Immediately after the initial nucleation stages, the vapor stream is rapidly and uniformly quenched at rates of at least 1,000 K/sec, preferably above 1,000,000 K/sec, to block the continued growth of the nucleated particles and produce a nanosize powder suspension of narrow particle-size distribution. The nanopowder is then harvested by filtration from the quenched vapor stream and the carrier medium is purified, compressed and recycled for mixing with new precursor material in the feed stream.

U.S. Pat. No. 5,984,997 and U.S. Pat. No. 6,569,397 disclose a process for producing nanoscale powders by mixing an emulsion comprising all of the elements of the desired powder composition and a combustible fuel, and then combusting that emulsion to produce a powder. Powders with a median particle size of less than 50 nm have been made by this process. The process is suitable for the production of many types of powders, including particles and nanowhiskers of simple, doped, and polymetallic powders.

The particular method of forming the laser marking additive into nano-sized particles is not believed to be vital to practicing this invention. Any method may be used that will yield particles of less than about 100 nm.

The nano-sized $Sb_2O_3$-doped $SnO_2$ as previously described is highly efficient as a YAG laser marking additive. That efficiency allows only a small quantity of the powder to be added to the material to be marked and achieve the desired marking attributes. In general, the marking additive loading is about 0.01–5% of the total weight of the article to be marked, and preferably about 0.01–0.1%. Additive levels of at least 0.025 wt % are particularly useful. The $Sb_2O_3$-doped $SnO_2$ laser marking additive can be incorporated into any plastic material which is transparent to YAG laser irradiation by any convenient method.

Dispersing the nano-sized marking additives within the plastic may be problematic. The small particle size of the marking additive may result in agglomeration of the additive and a less than uniform dispersion or mixing of the additive within the plastic composition and ultimate object that is formed. Accordingly, surface treatment of the laser-marking additives to reduce agglomeration may be useful. Such surface treatments are known in the art and include, for example, silanes, fatty acids, low molecular weight polymeric waxes, titanates, etc. Functionalized silanes may be particularly useful as the functionality can also render the additive compatible with the plastic to enhance uniform mixing within the plastic an avoidance of additive segregation. Typically the additive in powder form, whether treated or untreated, is mixed with the plastic prior to molding or applied as a coating. The plastic for molding can be in the form of chips, powders, or pellets. The solid mixture is then melted and mixed such as in an injection molding process, blow molding, or extrusion molding and the like. Alternatively, the laser marking additive may be thoroughly mixed with the melted resin and molded into chips, powders, or pellets which are again melted just prior to molding.

It has further been found that the addition of a metal or semimetal powder in concentrations of from, for example, 0.5 to 10% by weight, preferably from 0.5 to 7% by weight, and in particular from 0.5 to 5% by weight, based on the laser marking additive, improves the contrast achieved in the laser marking of thermoplastics.

The invention accordingly further provides a laser-markable plastic, characterized in that the plastic comprises a dopant of at least one metal powder or semimetal powder, preferably selected from the group consisting of aluminum, boron, titanium, magnesium, copper, tin, silicon and zinc.

Besides boron and silicon, other possible semi-metals are Sb, As, Bi, Ge, Po, Se and Te. The dopant preferably has a particle size of less than 500 nm, more preferably less than 200 nm.

The concentration of the dopant in the plastic is dependent, however, on the plastics system used. A too small fraction of dopant does not significantly alter the plastics system and does not influence its processability. Of the metal or semimetal powders mentioned, silicon powder is preferred. Besides the metal or semimetal powder, mixtures may also be used as dopant. The mixing ratio of metal to semi-metal is preferably from 1:10 to 10:1, but the metal and/or semimetal powders may be mixed with one another in any ratio. Preferred metal powder mixtures are: silicon/boron, silicon/aluminium, boron/aluminium and silicon/zinc.

In certain compositions of the dopant, the addition also of small amounts of a metal halide, preferably calcium chloride, is advantageous for the contrast of the laser marking of the plastic.

The incorporation of the nano-sized laser marking additve and of the metal and/or semimetal dopant powder into the plastic takes place by mixing the plastic granules with the additives and then shaping the mixture under the action of heat. The addition of the metal and/or semimetal powder and, respectively, of the powder mixture and the marking additive to the plastic may take place simultaneously or successively. During the incorporation of the dopant, any tackifiers, organic, polymer-compatible solvents, stabilizers and/or surfactants that are thermally stable under the operating conditions may be added to the plastic granules. The doped plastic granules are generally prepared by introducing the plastic granules into an appropriate mixer, wetting them with any additives, and then adding the marking additive and dopant and mixing them in. The plastic is generally pigmented by way of a color concentrate (masterbatch) or compounded formulation. The mixture obtained in this way may then be processed directly in an extruder or an injection molding machine. The molds formed in the course of processing exhibit a very homogeneous distribution of the dopant. Subsequently, laser marking takes place with an appropriate laser. For applied coatings, the additives can simply be mixed with the carrier for the polymer coating material or added as a solid to powder coating compositions.

The material to be marked can be an organic object such as a plastic or polymeric article. Suitable resins include, but are not limited to, any naturally occurring or synthetic polymer prepared by polymerization, polycondensation or polyaddition, such as polyethylene, polypropylene, polyisobutylene, polystyrene, polyvinyl chloride, polyvinylidene chloride, polyvinyl acetals, polyacrylonitrile, polyacrylates, polymethacrylates, polybutadiene, ABS, ethylene vinyl acetate, polyamides, polyimides, polyoxymethylene, polysulfones, polyphenylene sulfide, polycarbonates, polyurethanes, polyethers, polyether sulfones, polyacetals, phenolics, polycarbonate, polyester carbonate, polyethylene terephthalate, polybutylene terephthalate, polyarylates, polyether ketones, and mixtures and copolymers thereof. The above polymers can also be formulated into coating compositions as is well known in the art and applied by known coating techniques to any type of substrate.

The nano-sized laser marking additives of this invention can be incorporated into a resin formulated into any size or configuration. No limits regarding the shape of the article to be marked can be contemplated. Three-dimensional plastic parts, containers, packages, etc., regardless of how formed such as by injection molding, extrusion, blow molding, and the like can include the nano-sized additives of this invention and marked by a laser by techniques known in the art.

Besides three-dimensional parts, containers, packages, and the like, the nano-sized additives, for example, can be incorporated into plastic sheeting or film to produce transparent (or color-free) plastic sheeting that can be laser marked with a dark mark. Potential applications include packaging, labeling, and laminated plastic sheets. The nano-sized additives can be incorporated into co-extruded multi-layered films such as iridescent film to produce special effect film that can be laser marked. One marking option is to produce a dark mark similar to above, and the other option is to use low power laser to heat the film to melting, rather than charring, to produce a mark with different optical properties from the original iridescent film. Potential applications include packaging, labeling, and laminated plastic sheets. The nano-sized additives can be incorporated into plastic that is blown to make transparent (or color-free) plastic bags that can be laser marked with a dark mark. Potential application is the ability to mark a plastic bag for any purpose including labeling with information on the contents of the bag.

EXAMPLE 1

A charge of 0.05 wt % of a powder of $Sb_2O_3$-doped $SnO_2$ mixed oxide was mixed with pellets of PETG (polyethylene terephthlate glycol). The mixed oxide powder had a loading of 2 wt % $Sb_2O_3$ and had a size ranging from 20–50 nm. The mixture of nano-sized additive and PETG pellets was injection molded into step chips. A YAG laser beam was imposed on the resulting step chip using a current of 13–16 amps, a pulse frequency of 1–9 kHz, a scan velocity of 300 mm/sec. and an aperture of 0.0635 in. It was found that distinct lines having a width of about 0.1 mm could be achieved. This was a result of the laser marking additive absorbing the YAG laser energy and converting it to heat so as to carbonize the surrounding polymeric material, thereby making a black or dark mark which was in contrast to the surrounding area. Using a stereomicroscope, the marks were seen to be due to heavy foaming and charring of the polymer, as expected.

PETG is a crystal clear polymer. At the loading of 0.05 wt %, the polymer acquired a slight blue hue, but retained original clarity. 2–3 micron $Sb_2O_3$-doped $SnO_2$ results in a hazy, colored polymer when used at the same loading.

EXAMPLE 2

Antimony doped tin oxide nanoparticles as in Example 1 and having a size of 50 nm are incorporated into low-density polyethylene plastic sheeting to produce transparent plastic sheeting. The loading of the additive is 0.05% by weight. The plastic sheeting is laser marked with a YAG laser to produce a dark mark.

EXAMPLE 3

Antimony doped tin oxide nanoparticles as in Example 1 and having a size of 50 nm are incorporated into the skin layer of an iridescent film to produce special effect film that can be laser marked. The loading of the additive is 0.05% by weight. The special effect film is laser marked with a YAG laser to produce a dark mark.

EXAMPLE 4

The special effect film of Example 3 is laser marked with a YAG laser set at a low power to heat the film to melting, rather than charring, to produce a mark with different optical properties from the original iridescent film.

EXAMPLE 5

Antimony doped tin oxide nanoparticles having a size of 50 nm are incorporated into low density polyethylene at a loading of 0.05% by weight. The loaded LDPE is blown to make transparent plastic bags. The plastic bag is laser marked with a YAG laser to produce a dark mark.

EXAMPLE 6

$SiO_2$ nanoparticles having a size of 50 nm are incorporated into low density polyethylene plastic sheeting to produce transparent plastic sheeting. The loading of the additive is 0.50% by weight. The plastic sheeting is laser marked with a $CO_2$ laser to produce a dark mark.

EXAMPLE 7

$SiO_2$ nanoparticles having a size of 50 nm are incorporated into the skin layer of an iridescent film to produce special effect film that can be laser marked. The loading of $SiO_2$ is 0.50% by weight. The special effect film is laser marked with a $CO_2$ laser to produce a dark mark.

EXAMPLE 8

The special effect film of Example 7 is laser marked with a $CO_2$ laser set at a low power to heat the film to melting, rather than charring, to produce a mark with different optical properties from the original iridescent film.

EXAMPLE 9

$SiO_2$ nanoparticles having a size of 50 nm are incorporated into low density polyethylene at a loading of 0.50% by weight. The loaded LDPE is blown to make transparent plastic bags. The plastic bag is laser marked with a $CO_2$ laser to produce a dark mark.

EXAMPLE 10

Example 2 is repeated except that in addition, a silicon powder is added in amounts of 10 wt. % relative to the amount of antimony doped tin oxide nanoparticles added and also incorporated into the low-density polyethylene plastic to produce transparent plastic sheeting. The plastic sheeting is laser marked with a YAG laser to produce a highly contrasted dark mark.

What is claimed is:

1. In a method of laser marking an article containing a laser marking additive therein by impinging a laser beam on the article, wherein said article is a plastic resin, the improvement which comprises utilizing a particulate laser marking additive having a particle size of less than 100 nm, said article optionally containing at least one metal powder and/or semimetal powder selected from the group consisting of aluminum, boron, titanium, magnesium, copper, tin, silicon, zinc, and mixtures thereof.

2. The improvement of claim 1 wherein said laser is a YAG laser and the additive is a mixed oxide of antimony and tin.

3. The improvement of claim 2 wherein the antimony oxide is about 2–5 wt. % of the mixed oxide.

4. The improvement of claim 1 wherein the particles have a size of about 10–70 nm.

5. The improvement of claim 1 wherein said laser is a $CO_2$ laser and the additive contains $SiO_2$ bonds.

6. The improvement of claim 5 wherein said additive is silica.

7. The improvement of claim 6 wherein said article is a plastic film.

8. The improvement of claim 7 wherein said plastic film is a co-extruded multilayered film.

9. The improvement of claim 8 wherein said film is an iridescent film.

10. The improvement of claim 1 wherein said plastic resin is in the form of a 3-dimensional part, container, or package.

11. The improvement of claim 1 wherein said plastic resin is in the form of a sheet or film.

12. The improvement of claim 1 wherein said plastic resin is in the form of a coating or ink on a substrate.

13. The improvement of claim 1 wherein said article is a plastic film.

14. The improvement of claim 13 wherein said plastic film is a co-extruded multilayered film.

15. The improvement of claim 14 wherein said film is an iridescent film.

16. The improvement of claim 14 wherein said film is transparent.

17. The improvement of claim 16 wherein a top or bottom layer of said multilayered film contains the laser marking additive and the marking is visible from a side of the multilayered film opposite the side of the film layer containing the additive.

* * * * *